(12) United States Patent
Lee

(10) Patent No.: US 12,090,970 B1
(45) Date of Patent: Sep. 17, 2024

(54) OUTRIGGER SAFTEY GUARD

(71) Applicant: Martin Concrete Construction, Inc., Kennesaw, GA (US)

(72) Inventor: Steven Phillips Lee, Canton, GA (US)

(73) Assignee: Martin Concrete Construction, Inc., Keenesaw, GA (US)

( * ) Notice: Subject to any disclaimer, the term of this patent is extended or adjusted under 35 U.S.C. 154(b) by 0 days.

(21) Appl. No.: 18/199,937

(22) Filed: May 20, 2023

(51) Int. Cl.
*B60S 9/02* (2006.01)
*B66C 23/88* (2006.01)
*F16P 1/00* (2006.01)

(52) U.S. Cl.
CPC ............ *B60S 9/02* (2013.01); *B66C 23/88* (2013.01); *F16P 1/00* (2013.01)

(58) Field of Classification Search
CPC .... B60S 9/02; B66C 23/88; F16P 1/00; Y10T 74/2193
See application file for complete search history.

(56) References Cited

U.S. PATENT DOCUMENTS

| | | | | |
|---|---|---|---|---|
| 2,601,947 A * | 7/1952 | Buttner | ................ | F04D 29/703 415/121.2 |
| 4,070,984 A * | 1/1978 | Kappas | ................ | B63H 5/165 440/72 |
| 4,680,017 A * | 7/1987 | Eller | ................ | B63H 5/165 415/121.2 |
| 8,757,663 B1 * | 6/2014 | Glazer | ................ | B60S 9/12 280/763.1 |
| 8,859,905 B2 * | 10/2014 | Frye | ................ | H01B 17/00 174/138 E |

OTHER PUBLICATIONS

Hobart Bowl Guard/Cage Assembly; https://www.partstown.com/hobart/hob00-913102-00310?gclsrc=aw.ds&gad_source=1&gclid=EAlaIQobChMI17Ce16PEhQMVHFxHAR2ZWAVEAQYAyABEgJelPD_BwE&gclsrc=aw.ds.*

* cited by examiner

*Primary Examiner* — Adam D Rogers
(74) *Attorney, Agent, or Firm* — Gregory J. Krabacher

(57) ABSTRACT

An outrigger guard assembly may include one or more rigid guard sections. Each guard section may include a rigid inner ring located at a proximal end of the guard section and having one or more mounting members extending from the inner ring; a rigid outer ring located at a distal end of the guard section; and one or more rigid radial support members connecting the inner ring and outer ring. The outrigger guard assembly may further include one or more outrigger mating members rigidly attached to an outrigger and adapted to be rotationally mated with the one or more mounting members. The one or more guard sections may form a safety zone around the outrigger.

7 Claims, 4 Drawing Sheets

OUTRIGGER SAFTEY GUARD

CROSS-REFERENCE TO RELATED PATENTS

Applicant claims benefit of U.S. Provisional Patent Application No. 63/365,190, filed May 23, 2022.

TECHNICAL FIELD

The apparatuses and methods disclosed in this document pertain generally to the field of mechanical safety equipment, more specifically, guards used with outriggers and similar supporting members of heavy machinery.

BACKGROUND

Figure 1:
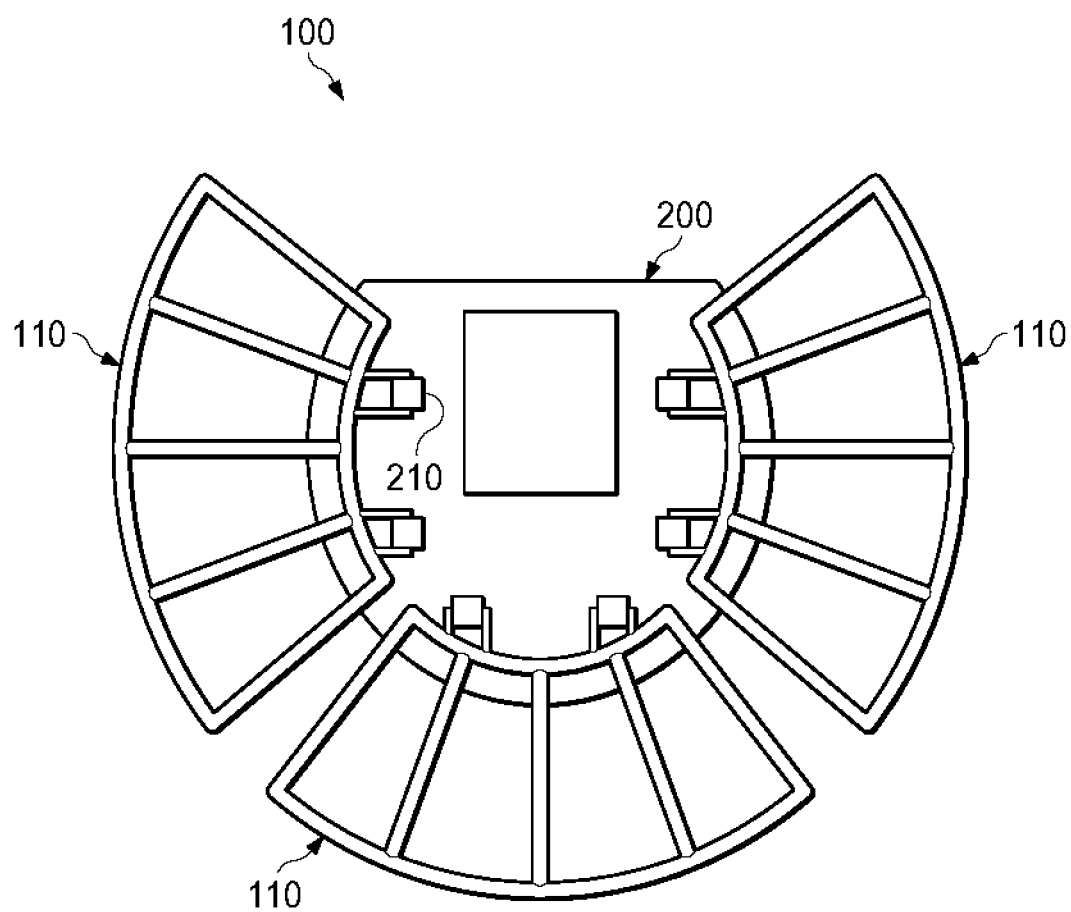
FIG. 1 is a plan view of a guard assembly mounted on an outrigger.

Industrial equipment and heavy machinery are commonly supported with external members such as outriggers to provide stabilization. To permit transport of the equipment, the outrigger can be configured to raise above the ground. When the equipment reaches its destination the outrigger can then lowered to the ground.

When the outrigger is lowered there exists a possibility of physical harm to any obstacle, such as a person or object that may be in the near vicinity. Workplace injury and deaths are a major focus of industrial centers and safety regulators. In particular, machine guarding is among the most commonly cited safety violations.

Counter-balancing the need for improved safety in guarding machines are the practical realities related to costs, ease of use, and durability. For example, some conventional guards rely upon expensive and fragile electrical components such as motion detectors, alarms, and electronic relays that must interface with the control of the outrigger. Such devices are susceptible to failures in the event of a loss of power (such may be caused by a dead battery), user error, or wear and tear in the industrial environment in which they are used. Other conventional guards may employ flexibly cable systems extending outward from the outrigger to physically alert a person that they are coming close to an outrigger. However, such barriers are limited to providing little more than a warning and are inadequate to physically block a person from coming within the danger zone of the outrigger, either because they are flexible or because they do not extend out far enough to provide meaningful protection.

The embodiments described herein provide a more elegant solution to the problem of guarding industrial equipment by providing a simple and effective safety barrier that is relatively inexpensive, easy to use, and durable.

SUMMARY

The apparatuses and methods disclosed and described in this document are described in detail with the views and examples of the included figures. Unless otherwise specified, like numbers in figures indicate references to the same or corresponding elements throughout the views of the figures. Those of ordinary skill in this art will recognize that modifications to disclosed and described components, elements, methods, materials, and so forth can be made and may be desired for a specific application.

In this disclosure, any identification of specific shapes, materials, techniques, and the like are either related to a specific example presented or are merely a general description of such a shape, material, technique, or the like. Identifications of specific details are not intended to be and should not be construed as mandatory or limiting unless specifically designated as such. Selected examples and methods of use are disclosed and described in detail below. It should be noted that those having an ordinary level of skill in this area will recognize from reading this disclosure that various components of the disclosed apparatuses can be combined in ways not specifically shown in the examples to create an additional specific configuration. For ease of understanding and readability, no attempt is made to catalog every possible combination of the disclosed components.

An outrigger guard assembly may include one or more rigid guard sections. Each guard section may include a rigid inner ring located at a proximal end of the guard section and having one or more mounting members extending from the inner ring. The guard sections may further include a rigid outer ring located at a distal end of the guard section. The guard section may further include one or more rigid radial support members connecting the inner ring and outer ring. The outrigger guard assembly may further include one or more outrigger mating members securely attached to an outrigger and adapted to be rotationally mated with the one or more mounting members. The one or more guard sections form a safety zone around the outrigger.

The outrigger guard assembly may further include mounting hardware for rotationally mating the outrigger mating members to the mounting members and adapted to permit guard sections to be mounted and unmounted from the outrigger.

In some embodiments, the one or more guard sections are arranged to form a semicircle around the outrigger.

In some embodiments, one or more guard sections are of a preconfigured size to create an optimally sized safety zone around an outrigger.

In some embodiments, the outrigger guard assembly is brightly colored.

In some embodiments, the outrigger guard assembly comprises a plurality of sets of one or more guard sections.

In some embodiments, the outrigger guard assembly is configured to permit a first set of guard sections to be replaced with an alternative set of guard sections.

In some embodiments, the one or more guard sections of the first set are of a different size than the guard sections of the alternative set.

DETAILED DESCRIPTION

As shown in FIG. 1, a guard assembly 100 may comprise one or more guard sections 110. In the embodiment depicted in FIG. 1, three guard sections 110 are each mated with outrigger mating members 210 attached to an outrigger 200. As shown, the guard sections 110 can be arranged to form a semicircle around the outrigger 200. The guard assembly 100 may comprise one, two, three, or more such guard sections 110, each forming a portion of the semicircle formed around the outrigger 200.

Figure 2:
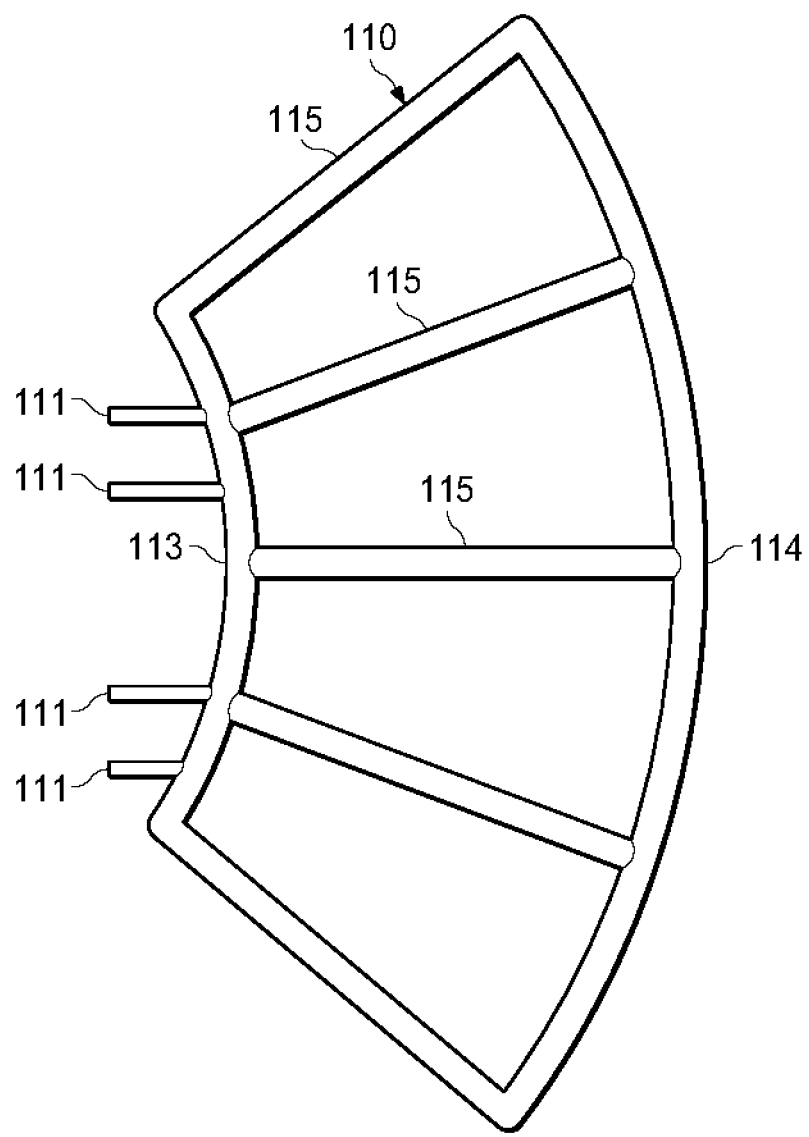
FIG. 2 is a plan view of a guard section.

Turning next to FIG. 2, a guard section 110 is shown. In this embodiment, a guard section 110 has an inner ring 113 located at a proximal end of the guard section 110 and forming a semicircle. The guard section 110 of FIG. 2 is further shown with an outer ring 114 located at a distal end of the guard section 110 and forming a semicircle relatively larger than the inner ring 113. The inner ring 113 and outer ring 114 can be connected by one or more radial support members 115. Each inner ring 113 has one or more mounting members 111, shown in FIG. 2 as extending from the inner ring 113 in the opposite direction as the outer ring 114. In some embodiments, the guard sections 110 can be made of metal, wood, or other suitably durable and rigid material. In some embodiments, the guard sections 110 can be brightly colored to add increased visibility and thereby further improve safety.

Figure 3:
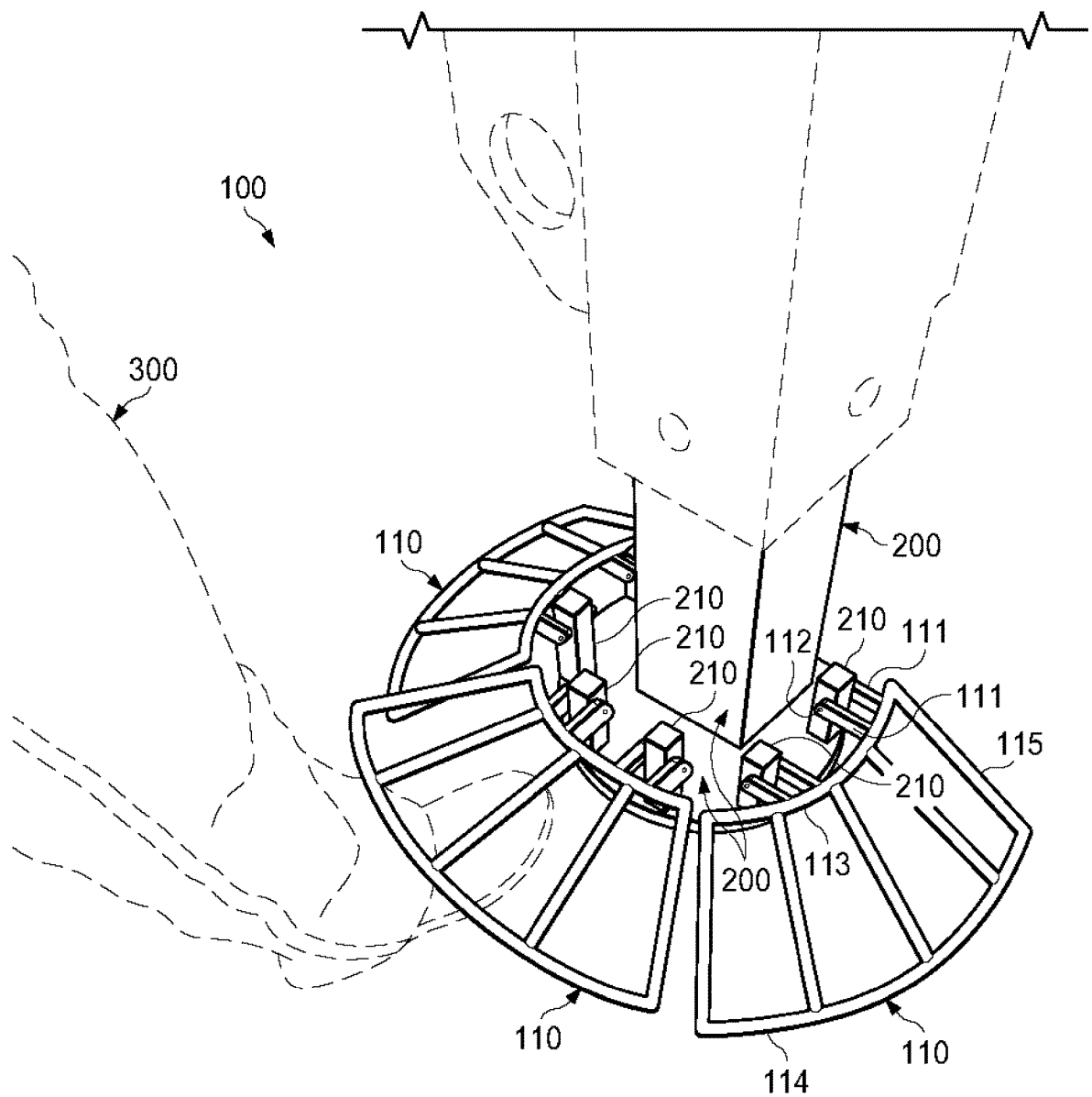
FIG. 3 is a perspective view of a guard assembly in operation.

In FIG. 3, a guard assembly 100 is shown in operation, with one more guard sections 110 mounted on an outrigger 200 by rotationally mating one or more mounting members 111 of the inner ring 113 of the guard sections 110 to outrigger mating members 210 using mounting hardware 112. Each guard section may be comprised of rigid components, including its inner ring 113, outer ring 114, and radial support members 115. As such, a guard section 110 is configured to provide a rigid lateral physical barrier to an object encountered at a proximal end of the guard section 110 while also being configured to permit rotation about a proximal end of the guard section 110, so as to protect the object from downward pressure such as may occur when the outrigger 200 is extended from an elevated to a lowered position.

For example, in the case of an outrigger 200 being extended downward while a worker walks toward the outrigger, the worker's leg is blocked when it comes into contact with the end of the rigid guard section 110 while at the same time the rotation of the guard section 110 about a proximal end of the guard section 110 protects the worker's foot from being crushed as the outrigger 200 extends downward carrying with it the guard assembly 100.

Figure 4:
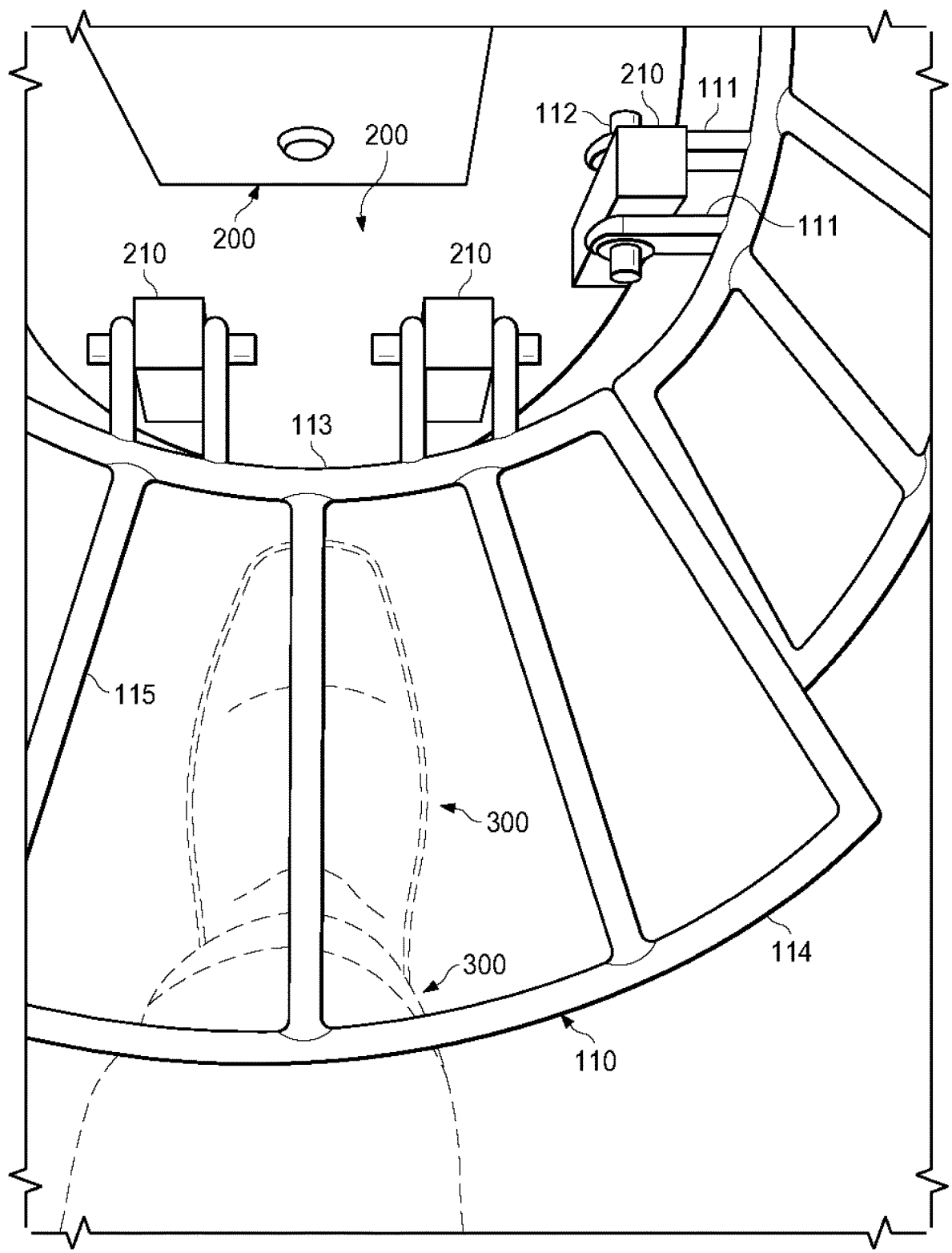
FIG. 4 is a perspective view of a portion of a guard assembly in operation.

As shown in FIG. 4, the guard sections 110 can have one or more mounting members 111 located on the inner ring 113 at a proximal end of the guard section 110. In some embodiments, the one or more mounting members 111 can be rotationally mated with one more outrigger mating member 210 using mounting hardware 112. In some embodiments, the mounting hardware 112 can include a bolt, washer, and nut. As depicted in FIG. 4, the outrigger mating members 210 and mounting members 111 can be adapted to receive a bolt or similar hardware inserted through them, permitting the mounting members 111 to rotate about the bolt such that if the outer ring 114 of the guard section 110 encounters an obstacle 300 then the guard section 110 is permitted to rotate upward while remaining attached to the outrigger 200.

In some embodiments, the outrigger mating member 210 can be metal, wood, or other suitably durable and rigid material. The outrigger mating members 210 may be rigidly attached to the outrigger 200 by welding, screws, bolts, dowels, or other mechanical fasteners, adhesives, any other suitable fastening means known in the art.

In some embodiments, the guard sections 110 can be optimally sized to protect objects from entering a predetermined safety zone around the outrigger 200 while the outrigger 200 is transitioning from an elevated position to a lowered position. For example, the guard section may have radial support members 115 of about 10 inches and mounting members of about 2 inches in length. Other embodiments may have alternative dimensions to optimally protect objects of varying sizes. In some embodiments, mounting hardware 112 is configured to permit a user to remove and replace guard sections 110 as desired, including to provide a larger or smaller safety zone around the outrigger 200 based upon the changing needs of the user and the environment in which the guard assembly 100 is being utilized.

In some embodiments, the above described guard assemblies may be supplied in multiple sizes of guard sections to permit the user the ability to adjust the size of the safety zone around the outrigger to an optimal distance.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of the apparatuses and methods disclosed and as are suited to particular uses contemplated. The scope is, of course, not limited to the examples set forth above, but can be employed in any number of applications and equivalent devices by those of ordinary skill in the art.

What is claimed is:

1. An outrigger guard assembly comprising:
   one or more rigid guard sections, each guard section comprising:
      a rigid inner ring located at a proximal end of the guard section and having one or more mounting members extending from the inner ring;
      a rigid outer ring located at a distal end of the guard section; and
      one or more rigid radial support members connecting the inner ring and outer ring;
   one or more outrigger mating members securely attached to an outrigger and adapted to be rotationally mated with the one or more mounting members; and
   wherein the one or more guard sections form a safety zone around the outrigger.

2. The outrigger guard assembly of claim 1 further comprising mounting hardware for rotationally mating the outrigger mating members to the mounting members and adapted to permit the one or more guard sections to be mounted and unmounted from the outrigger.

3. The outrigger guard assembly of claim 2 wherein the one or more guard sections are arranged to form a semicircle around the outrigger.

4. The outrigger guard assembly of claim 3 wherein the one or more guard sections are of a preconfigured size to create the safety zone around the outrigger.

5. The outrigger guard assembly of claim 4 wherein the outrigger guard assembly is colored to add increased visibility.

6. The outrigger guard assembly of claim 5 wherein the one or more rigid guard sections is comprised of a first set of guard sections that are configured to be replaced with an alternative set of guard sections.

7. The outrigger guard assembly of claim 6 wherein the first set of guard sections are of a different size than the guard sections of the alternative set.

* * * * *